(12) United States Patent
Umetsu et al.

(10) Patent No.: US 11,529,991 B2
(45) Date of Patent: Dec. 20, 2022

(54) CONTROL SYSTEM FOR VEHICLE

(71) Applicant: Mazda Motor Corporation, Hiroshima (JP)

(72) Inventors: Daisuke Umetsu, Aki-gun (JP); Yasumasa Imamura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 154 days.

(21) Appl. No.: 16/953,735

(22) Filed: Nov. 20, 2020

(65) Prior Publication Data
US 2021/0197894 A1    Jul. 1, 2021

(30) Foreign Application Priority Data
Dec. 25, 2019   (JP) .............................. JP2019-234261

(51) Int. Cl.
*B60W 10/196* (2012.01)
*B60W 30/045* (2012.01)
*B60W 40/13* (2012.01)
*B62D 15/02* (2006.01)
*B60W 30/08* (2012.01)

(52) U.S. Cl.
CPC .......... *B62D 15/021* (2013.01); *B60W 30/08* (2013.01); *B60W 2710/105* (2013.01); *B60W 2710/18* (2013.01); *B60W 2710/205* (2013.01)

(58) Field of Classification Search
None
See application file for complete search history.

(56) References Cited

U.S. PATENT DOCUMENTS

2020/0406883 A1\* 12/2020 Umetsu ................. B60T 8/1755

FOREIGN PATENT DOCUMENTS

JP            2019142308 A       8/2019

\* cited by examiner

*Primary Examiner* — Adam D Tissot
*Assistant Examiner* — Laura E Linhardt
(74) *Attorney, Agent, or Firm* — Alleman Hall Creasman & Tuttle LLP

(57) ABSTRACT

A control system for a vehicle is provided, which includes an accelerator pedal and a steering wheel configured to be operated by a driver, an accelerator opening sensor configured to detect an accelerator opening corresponding to operation of the accelerator pedal, a steering angle sensor configured to detect a steering angle corresponding to operation of the steering wheel, and a controller configured to set an additional deceleration to be applied to the vehicle in order to control a posture of the vehicle based on the detected steering angle, when the steering wheel is turned, and apply the additional deceleration to the vehicle. The controller sets the additional deceleration based on the detected accelerator opening, in addition to the steering angle, and sets the additional deceleration larger while the vehicle is towing than while the vehicle is not towing, when the additional decelerations are compared at the same accelerator opening.

18 Claims, 13 Drawing Sheets

CONTROL SYSTEM FOR VEHICLE

TECHNICAL FIELD

The present disclosure relates to a control system for a vehicle, which controls a posture of the vehicle according to steering.

BACKGROUND OF THE DISCLOSURE

Conventionally, a technology for controlling a vehicle posture is known, which reduces torque given to a vehicle to cause the vehicle to decelerate or slow down when a driver operates a steering wheel so that a cornering operation of the driver becomes natural and stable. According to this technology, by promptly adding a load to front wheels at the time of steering operation, a frictional force between the front wheels and the road surface increases and a cornering force of the front wheels increases accordingly. Therefore, the turn-in ability of the vehicle in an early stage of entering a curve improves, thereby improving the response to a turning operation of the steering wheel (i.e., steering stability). As a result, it becomes possible to achieve a control of the vehicle posture as the driver intended. Note that in the following, such a control of the posture of the vehicle according to the steering operation is suitably referred to as a "vehicle posture control."

Meanwhile, when a vehicle is towing something (e.g., when a vehicle is towing a trailer coupled to the rear of the vehicle), rear suspensions are contracted so that a vehicle body rear part sinks relative to a front part. Thus, when the deceleration is caused in the vehicle according to the steering operation by the vehicle posture control under the situation where the sinking of the vehicle body rear part is occurring, since the vehicle body rear part has already sunk, a sinking of the vehicle body front part accompanying the deceleration is reduced. Therefore, the desired vehicle posture may not be realized.

For example, JP2019-142308A discloses a technology for achieving a desired vehicle posture even when a vehicle is towing. JP2019-142308A discloses the technology for giving a deceleration to the vehicle so that the vehicle posture is controlled when a turning operation of a steering wheel is carried out. The deceleration given to the vehicle is increased when the vehicle is towing, as compared to the deceleration when the vehicle is not towing. Thus, even in the situation where the vehicle body rear part sinks and the pitching of the vehicle body is suppressed, the insufficient sinking of the vehicle body front part when giving the deceleration to the vehicle can be solved to obtain the desired vehicle turning performance.

Here, as disclosed in JP2019-142308A, the inventors discovered that, as a result of diligent research, the above configuration alone for increasing the deceleration given to the vehicle when the towing is performed, rather than when the towing is not performed, may not be enough for achieving the desired vehicle posture. The reason is as follows.

When the towing is performed (hereinafter, may simply be referred to as "during towing"), the driver tends to step on an accelerator pedal more than when the towing is not performed (hereinafter, may simply be referred to as "during non-towing"). This is because various drags increase from the towing object being added to the vehicle. Therefore, in order to achieve, during towing, the vehicle speed and the acceleration equivalent to those during non-towing, it is naturally necessary to increase the driving force given to the vehicle. However, in such a situation where the accelerator pedal is largely stepped on during towing and the driving force is increased, the sinking of the vehicle body front part accompanying the deceleration by the vehicle posture control becomes insufficient. Therefore, it becomes difficult to achieve the desired vehicle posture.

In the technology disclosed in JP2019-142308A, the magnitude of the additional deceleration which is given to the vehicle in the vehicle posture control is fundamentally set corresponding to a steering speed when performing a turning operation of the steering wheel and whether or not the vehicle is towing. That is, the technology disclosed in JP2019-142308A only takes into consideration whether or not the vehicle is towing, and it sets the additional deceleration in the vehicle posture control without taking into consideration the operating amount of the accelerator pedal (accelerator opening) by the driver during towing. Therefore, according to this technology disclosed in JP2019-142308A, the sinking of the vehicle body front part accompanying the deceleration by the vehicle posture control may become insufficient and the desired vehicle turning performance may not be appropriately achieved, in such a situation where the accelerator opening is large during towing (when comparing the accelerator opening during towing and during non-towing, while the vehicle travels substantially at the same speed and acceleration).

SUMMARY OF THE DISCLOSURE

The present disclosure is made in order to solve the problems of the conventional technology described above, and one purpose thereof is to provide a control system for a vehicle, which gives an additional deceleration to the vehicle in order to control a vehicle posture when performing a turning operation of a steering wheel, and securely achieves a desired vehicle posture also during towing by setting the additional deceleration in consideration of an accelerator opening during towing.

According to one aspect of the present disclosure, a control system for a vehicle is provided, which includes an accelerator pedal and a steering wheel configured to be operated by a driver, an accelerator opening sensor configured to detect an accelerator opening corresponding to operation of the accelerator pedal, a steering angle sensor configured to detect a steering angle corresponding to operation of the steering wheel, and a controller configured to set an additional deceleration to be applied to the vehicle in order to control a posture of the vehicle based on the steering angle detected by the steering angle sensor, when the steering wheel is turned, and apply the additional deceleration to the vehicle. The controller sets the additional deceleration based also on the accelerator opening detected by the accelerator opening sensor, in addition to the steering angle, and sets the additional deceleration larger while the vehicle is towing than while the vehicle is not towing, when compared at the same accelerator opening.

According to this configuration, the controller sets the additional deceleration in consideration of the accelerator opening, and when setting the additional deceleration according to the accelerator opening, the additional deceleration set at the same accelerator opening is made larger during towing than during non-towing. Thus, according to the accelerator opening by the driver during towing, the additional deceleration applied to the vehicle posture control can be set appropriately, and therefore, it becomes possible to securely achieve the desired vehicle posture also during towing. In detail, in the situation where the accelerator opening is large during towing (when the accelerator openings during towing and during non-towing at similar speeds and accelerations are compared), by applying the additional deceleration which is set larger according to the accelerator opening, insufficient sinking of the vehicle body front part by the vehicle posture control can be compensated appropriately, and it becomes possible to securely achieve the desired vehicle turning performance.

The control system may further include a switch for selecting a traveling mode set to the vehicle, the traveling mode at least including a towing mode. The controller may set the additional deceleration larger while the towing mode is selected by the switch than while the towing mode is not selected, when compared at the same accelerator opening. According to this configuration, when the towing mode is selected by the driver operating the switch, the controller determines that the vehicle is towing and increases the additional deceleration which is set according to the accelerator opening. Thus, since the mode of the additional deceleration set in the vehicle posture control is changed when the driver positively operates the switch to select the towing mode as the traveling mode, an uncomfortable feeling given to the driver can be suppressed appropriately by this change.

The control system may further include a drive source configured to generate torque for driving the vehicle. The controller may control the drive source to reduce the torque generated by the drive source so that the additional deceleration is applied to the vehicle. According to this configuration, by reducing the torque generated by the drive source (e.g., an engine, an electric motor), the desired additional deceleration can be applied to the vehicle suitably.

The control system may further include a braking system configured to give a braking force to the vehicle. The controller may control the braking system to give the braking force to the vehicle so that the additional deceleration is applied to the vehicle. According to this configuration, by applying the braking force by the braking system (e.g., a brake), the desired additional deceleration can be applied to the vehicle suitably.

The control system may further include a generator configured to be driven by wheels of the vehicle and regenerate power. The controller may control the generator so that the generator regenerates the power to apply the additional deceleration to the vehicle. According to this configuration, by causing the generator to regenerate the power so that the braking force by the regeneration is applied to the vehicle, the desired additional deceleration can be applied to the vehicle suitably.

The controller may reduce the additional deceleration as the accelerator opening detected by the accelerator opening sensor increases. According to this configuration, when the driver has stepped hard on the accelerator pedal and is sensitive to the change in the vehicle speed, it can suppress the drag feeling of the brake resulting from generating the large deceleration by the vehicle posture control.

The controller may calculate a steering speed based on the steering angle detected by the steering angle sensor, and set the additional deceleration larger as the steering speed increases. According to this configuration, the additional deceleration which suits the steering operation by the driver can be applied to the vehicle suitably in the vehicle posture control.

The vehicle may be comprised of a trailer, a coupler, and a tractor. The center of gravity position of the trailer may be located forward of an axle thereof so that a given vertical load is applied to the coupler. The vehicle may be provided with a towing mode selecting switch configured to be turned on by the driver when the trailer is coupled to a rear part of the tractor through the coupler. When the steering wheel is turned, the controller may set the additional deceleration applied to the vehicle larger while the towing mode selecting switch is turned on than while the towing mode selecting switch is turned off.

The controller may include a first map and a second map defining gains to be used for correcting the additional deceleration calculated according to a steering speed. Both the first and second maps may define the gains so that the gain becomes smaller as the accelerator opening increases, the gain of the second map being larger than the gain of the first map. When the vehicle is not towing, the controller may control the vehicle so that the additional deceleration is corrected based on the gain calculated based on the first map, and when the vehicle is towing, the controller may control the vehicle so that the additional deceleration is corrected based on the gain calculated based on the second map.

DETAILED DESCRIPTION THE DISCLOSURE

Hereinafter, control systems for a vehicle according to embodiments of the present disclosure will be described with reference to the accompanying drawings.

<Fundamental Concept>

Figure 1:
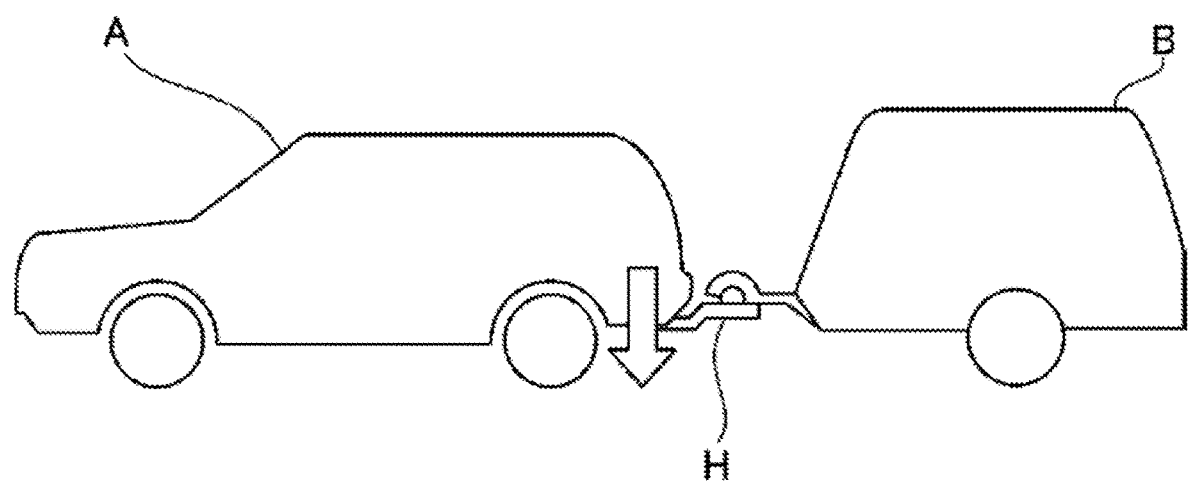
FIG. 1 is a side view schematically illustrating a vehicle which tows a trailer.

First, a sinking of a vehicle body rear part when a vehicle is towing a trailer is described with reference to FIG. 1. FIG. 1 is a side view schematically illustrating a tractor which tows the trailer.

As illustrated in FIG. 1, a trailer B is coupled to a rear part of a tractor A through a coupler H. In order to secure the traveling stability during towing, the center of gravity position of the trailer B is located forward of an axle so that a suitable vertical load (e.g., 10%-20% of the total weight of the trailer B) is applied to the coupler H. Therefore, during towing, a force which presses down the vehicle body rear part of the tractor A acts through the coupler H (an arrow in FIG. 1), rear suspensions are contracted, and the vehicle body rear part sinks relative to the front part.

Thus, when the tractor A is slowed down by a conventional vehicle posture control while the vehicle body rear part sinks, a pitching moment for sinking the vehicle body front part of the tractor A occurs. However, since the pitching of the vehicle body is suppressed by the vertical load applied from the trailer B to the vehicle body rear part of the tractor A through the coupler H, the sinking of the vehicle body front part is also suppressed. That is, in the conventional vehicle posture control, the sinking of the vehicle body front part when the vehicle during towing slows down is less than the sinking of the vehicle body front part when the vehicle during non-towing slows down at the same deceleration. Therefore, in the conventional vehicle posture control, in order to slow down the vehicle during towing and sink the vehicle body front part with substantially the same amount as during non-towing, it is necessary to give the vehicle a larger deceleration than non-towing.

First Embodiment

Next, various kinds of embodiments of the control system for the vehicle according to the present disclosure will be described. First, a first embodiment of the present disclosure is described.

(System Configuration)

Figure 2:
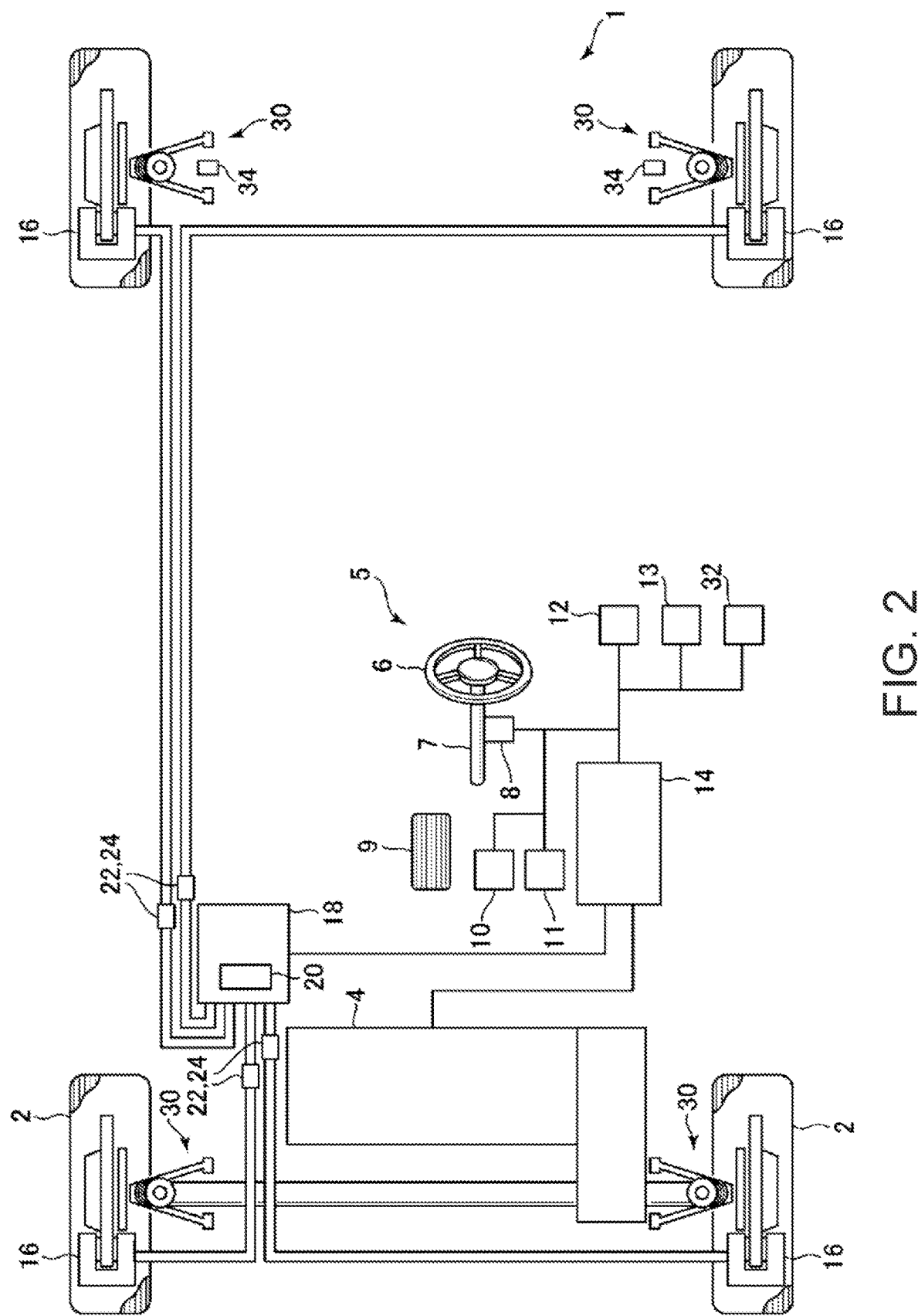
FIG. 2 is a block diagram illustrating the overall configuration of the vehicle on which a control system for the vehicle according to a first embodiment of the present disclosure is mounted.

FIG. 2 is a block diagram illustrating the overall configuration of the vehicle on which the control system for the vehicle according to the first embodiment of the present disclosure is mounted.

In FIG. 2, the reference character "1" illustrates the vehicle on which the control system for the vehicle according to this embodiment is mounted. An engine 4 is mounted on the vehicle body front part of the vehicle 1 as a drive source which drives drive wheels (left and right front wheels 2 in the example of FIG. 2). The engine 4 is an internal combustion engine, such as a gasoline engine or a diesel engine, and is a gasoline engine having an ignition plug 28 (see FIG. 3) in this embodiment.

The vehicle 1 also includes a steering device 5 having a steering wheel 6 and a steering shaft 7 for steering the vehicle 1, a steering angle sensor 8 which detects a turning angle of the steering wheel 6, an accelerator opening sensor 10 which detects an accelerator opening corresponding to a stepping amount of an accelerator pedal 9, a brake stepping amount sensor 11 which detects a stepping amount of a brake pedal, a vehicle speed sensor 12 which detects a vehicle speed, and an acceleration sensor 13 which detects an acceleration. These sensors output respective detected values to a controller 14. This controller 14 is comprised of, for example, a PCM (Power-train Control Module). Further, each wheel of the vehicle 1 is attached to the vehicle body through a suspension 30 including a spring (elastic member) and a suspension arm. Note that the steering angle sensor 8 may detect, instead of the turning angle of the steering wheel 6, various properties of the steering system (a rotation angle of a motor which gives assisting torque, a displacement of a rack in a rack and pinion mechanism), and a steered angle (tire angle) of the front wheels 2, as the steering angle.

The vehicle 1 also includes a brake control system 18 which supplies brake fluid pressure to a wheel cylinder and a brake caliper of a brake device 16 provided to each wheel. The brake control system 18 is provided with a hydraulic pump 20 which generates the brake fluid pressure required for generating a braking force of the brake device 16 provided to each wheel. The hydraulic pump 20 is, for example, driven by electric power supplied from a battery, and therefore, it is capable of generating the brake fluid pressure required for generating the braking force of each brake device 16 even when the brake pedal is not stepped on. The brake control system 18 also includes a valve unit 22 (in detail, a solenoid valve) provided to a hydraulic pressure supply line to the brake device 16 of each wheel and for controlling the hydraulic pressure supplied from the hydraulic pump 20 to the brake device 16 of each wheel. For example, an opening of the valve unit 22 is changed by adjusting power supply from the battery to the valve unit 22. The brake control system 18 also includes a hydraulic pressure sensor 24 which detects a hydraulic pressure supplied from the hydraulic pump 20 to the brake device 16 of each wheel. The hydraulic pressure sensor 24 is, for example, disposed at a connecting part of each valve unit 22 and the hydraulic pressure supply line downstream thereof, and detects the hydraulic pressure downstream of each valve unit 22 and outputs a detected value to the controller 14. Such a brake control system 18 calculates the hydraulic pressure to be supplied independently to the wheel cylinder and the brake caliper of each wheel based on a braking-force command value inputted from the controller 14 and the detected value of the hydraulic pressure sensor 24, and controls a rotational speed of the hydraulic pump 20 and an opening of the valve unit 22 according to the hydraulic pressures.

Figure 3:
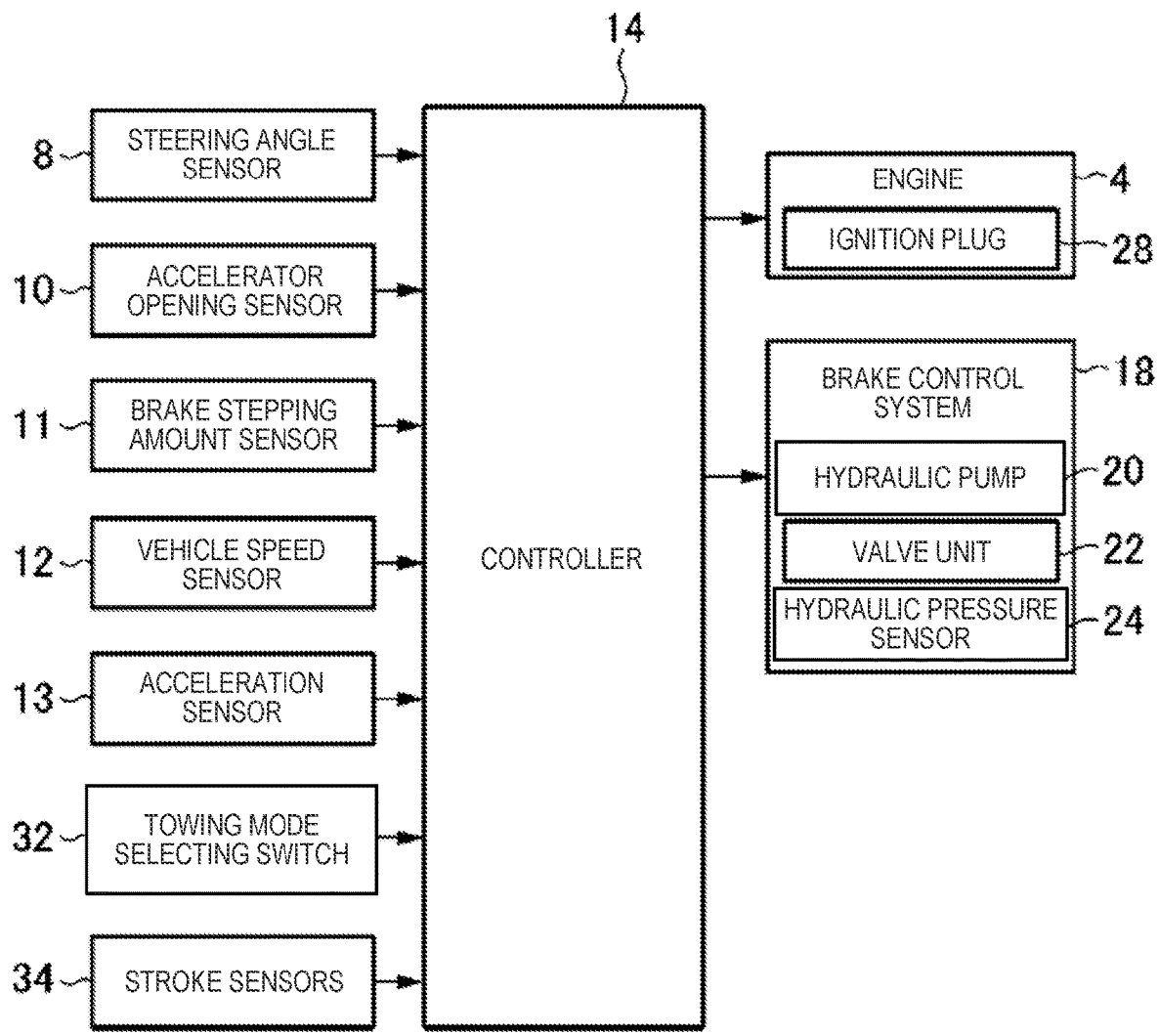
FIG. 3 is a block diagram illustrating an electrical configuration of the control system for the vehicle according to the first embodiment of the present disclosure.

Next, an electrical configuration of the control system for the vehicle according to the first embodiment of the present disclosure is described with reference to FIG. 3. FIG. 3 is a block diagram illustrating the electrical configuration of the control system for the vehicle according to the first embodiment of the present disclosure.

Based on the detection signals of the sensors 8, 10, 11, 12, and 13 and the detection signals outputted from various sensors which detect an operating state of the vehicle 1, the controller 14 according to this embodiment outputs a control signal to each part of the engine 4 (e.g., a throttle valve, a turbocharger, a variable valve mechanism, the ignition plug 28, a fuel injection valve, and an exhaust gas recirculation (EGR) system) in order to control the driving force given to the vehicle 1, and outputs a control signal to each of the hydraulic pump 20 and the valve unit 22 of the brake control system 18 in order to control the braking force given to the vehicle 1.

Moreover, in addition to the detection signals of the sensors 8, 10, 11, 12, and 13, ON/OFF of a towing mode selecting switch 32 for selecting a towing mode as a traveling mode set to the vehicle 1, and a detection signal of a stroke sensor 34 which detects a stroke of the rear suspension 30 are inputted into the controller 14. The traveling mode set to the vehicle 1 includes, in addition to the towing mode, a sport mode and a rough road (off-road) mode. The towing mode selecting switch 32 is operated by the driver when making the vehicle 1 perform towing, and at this time, an ON signal is outputted to the controller 14 from the towing mode selecting switch 32. For example, the towing mode selecting switch 32 is a button switch (press switch) or a touch panel provided to a display unit installed in a vehicle cabin (in this case, the driver touches the touch panel to select the towing mode). Note that the towing mode may be selected by voice of the driver, and in this case, a processing unit (may be the controller 14) which analyzes the voice inputted from a microphone functions as the towing mode selecting switch 32.

The controller 14 and the brake control system 18 are controllers each comprised of circuitry based on a well-known microcomputer. For example, they are each comprised of one or more microprocessors as a central processing unit (CPU) which executes a program, and memory which is comprised of RAM (Random Access Memory) and ROM (Read Only Memory) and stores the program and data, and an I/O bus which performs input and output of an electrical signal.

Note that in this embodiment, the system including the engine 4, the steering wheel 6, the accelerator pedal 9, the controller 14, the brake control system 18, the steering angle sensor 8, the accelerator opening sensor 10, and the towing mode selecting switch 32 is an example of a "control system for the vehicle" in the present disclosure.

(Vehicle Posture Control)

Figure 4:
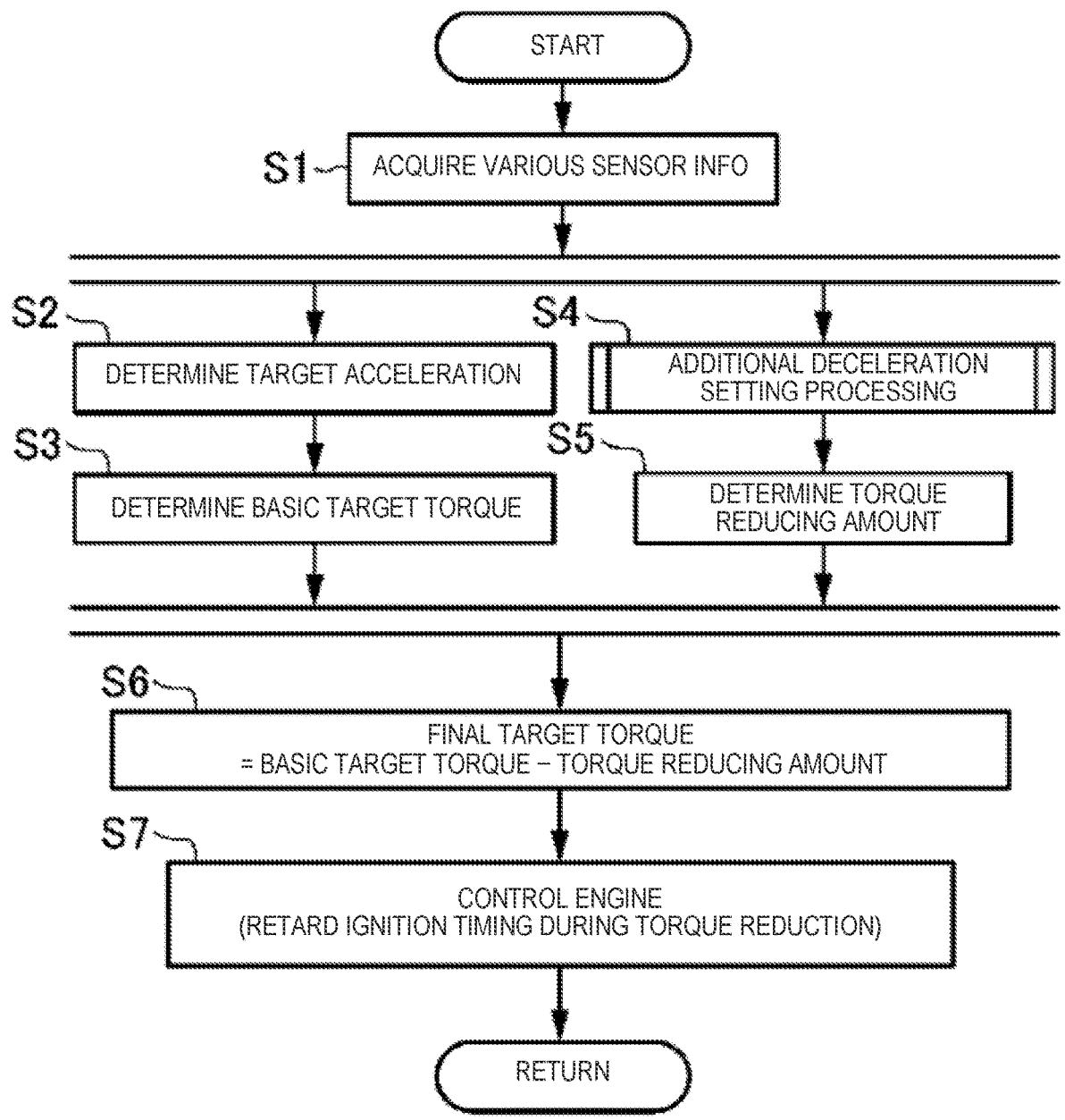
FIG. 4 is a flowchart of a vehicle posture control processing according to the first embodiment of the present disclosure.

Next, concrete control contents executed by the control system for vehicle in the first embodiment are described. First, an overall flow of a vehicle posture control processing executed by the control system for vehicle in the first embodiment of the present disclosure is described with reference to FIG. 4. FIG. 4 is a flowchart of the vehicle posture control processing according to the first embodiment of the present disclosure.

The vehicle posture control processing of FIG. 4 is started when an ignition switch of the vehicle 1 is turned on and the power is supplied to the controller 14, and is repeatedly executed at a given period (e.g., 50 ms).

As illustrated in FIG. 4, as the vehicle posture control processing is started, the controller 14 acquires, at Step S1, various sensor information on the operating state of the vehicle 1. In detail, the controller 14 acquires the detection signals outputted from the various sensors described above as information on the operating state, which include the steering angle detected by the steering angle sensor 8, the accelerator opening detected by the accelerator opening sensor 10, the brake-pedal stepping amount detected by the brake stepping amount sensor 11, the vehicle speed detected by the vehicle speed sensor 12, the acceleration detected by the acceleration sensor 13, the fluid pressure detected by the hydraulic pressure sensor 24, ON/OFF of the towing mode selecting switch 32, the stroke detected by the stroke sensor 34, and the gear stage currently set to a transmission of the vehicle 1.

Next, at Step S2, the controller 14 sets a target acceleration based on the operating state of the vehicle 1 acquired at Step S1. In detail, the controller 14 selects an acceleration characteristics map corresponding to the current vehicle speed and the current gear stage from acceleration characteristics maps (created in advance and stored in the memory) which define various vehicle speeds and various gear stages, and determines the target acceleration corresponding to the current accelerator opening while referring to the selected acceleration characteristics map.

Next, at Step S3, the controller 14 determines a basic target torque of the engine 4 for achieving the target acceleration determined at Step S2. In this case, the controller 14 determines the basic target torque within a range of torque which the engine 4 is outputable, based on the current vehicle speed, gear stage, road surface gradient, road surface etc.

Moreover, in parallel to the processing at Steps S2 and S3, the controller 14 performs an additional deceleration setting processing at Step S4 where it sets a deceleration to be applied to the vehicle 1 based on a steering speed of the steering wheel 6 in order to control the vehicle posture. The details of the additional deceleration setting processing will be described later.

Next, at Step S5, the controller 14 determines a torque reducing amount based on the additional deceleration set by the additional deceleration setting processing at Step S4. In detail, the controller 14 determines the torque reducing amount required for achieving the additional deceleration by lowering the generated torque of the engine 4, based on the current vehicle speed, gear stage, and road surface gradient, etc. which are acquired at Step S1.

After the processing at Steps S3 and S5, the controller 14 determines, at Step S6, a final target torque based on the basic target torque determined at Step S3 and the torque reducing amount determined at Step S5. For example, the controller 14 uses a value obtained by subtracting the torque reducing amount from the basic target torque, as the final target torque.

Next, at Step S7, the controller 14 controls the engine 4 so as to output the final target torque set at Step S6. In detail, the controller 14 determines various properties required for achieving the final target torque (e.g., an air filling amount, a fuel injection amount, an intake air temperature, an oxygen concentration, etc.) based on the final target torque set at Step S6 and the engine speed, and it controls actuators which drive respective components of the engine 4 based on the properties. In this case, the controller 14 sets limiting values and limiting ranges corresponding to the properties and sets a controlled variable of each actuator so that the property conforms to the limiting value and the limiting range, and performs the control.

In more detail, if the engine 4 is a gasoline engine, the controller 14 reduces the generated torque of the engine 4 by retarding an ignition timing of the ignition plug 28 from an ignition timing when the basic target torque is used as the final target torque. On the other hand, if the engine 4 is a diesel engine, the controller 14 reduces the generated torque of the engine 4 by decreasing the fuel injection amount from a fuel injection amount when the basic target torque is used as the final target torque. After Step S7, the controller 14 ends the vehicle posture control processing.

Figure 5:
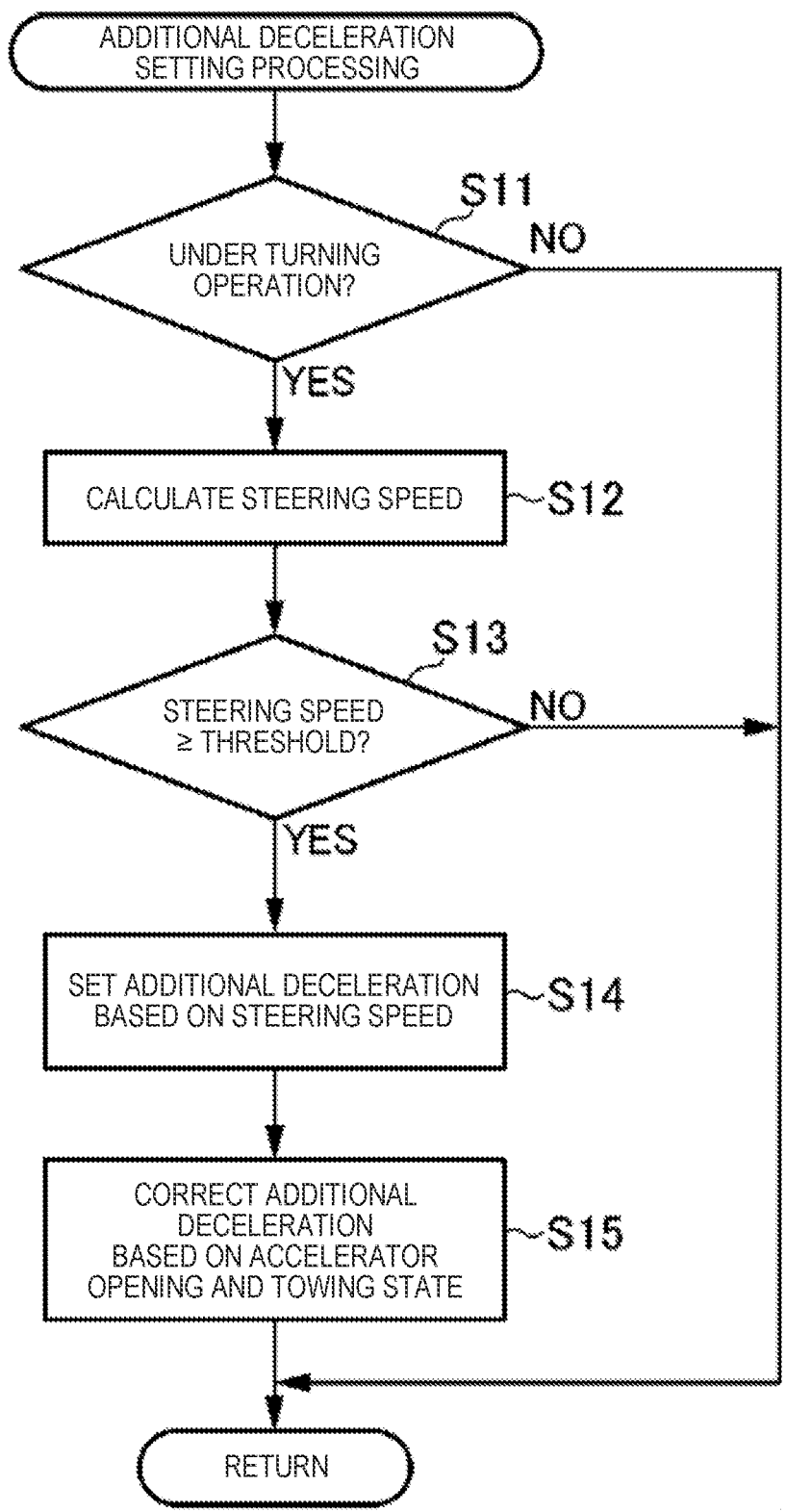
FIG. 5 is a flowchart of an additional deceleration setting processing according to the first embodiment of the present disclosure.
Figure 6:
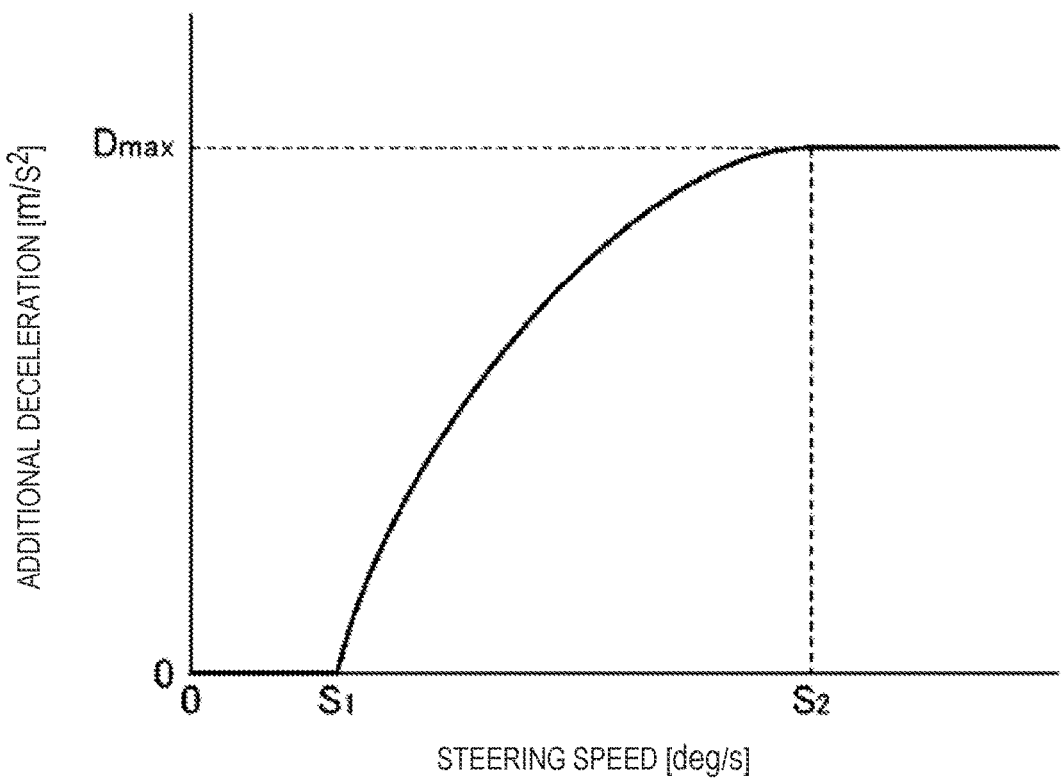
FIG. 6 is a map illustrating a relationship between an additional deceleration and a steering speed according to the first embodiment of the present disclosure.
Figure 7:
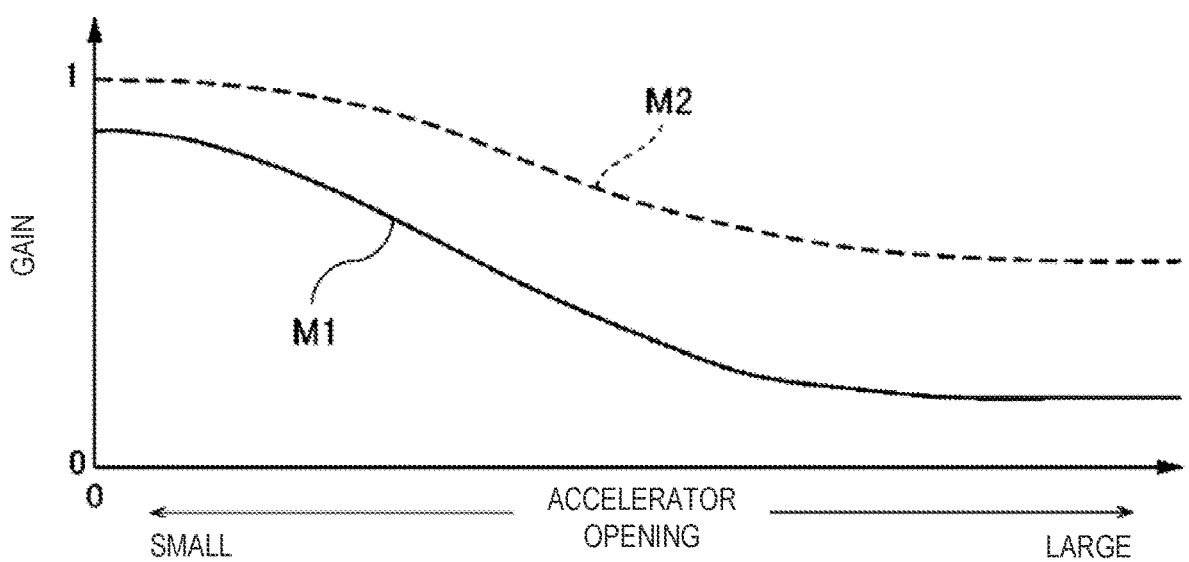
FIG. 7 is a map which defines a gain for correcting the additional deceleration according to the first embodiment of the present disclosure.

Next, the additional deceleration setting processing in the first embodiment of the present disclosure is described with reference to FIGS. 5 to 7. FIG. 5 is a flowchart of the additional deceleration setting processing according to the first embodiment of the present disclosure. Fig. 6 is a map illustrating a relationship between the additional deceleration and the steering speed according to the first embodiment of the present disclosure. FIG. 7 is a map which defines a gain for correcting the additional deceleration according to the first embodiment of the present disclosure.

When the additional deceleration setting processing is started, the controller 14 determines, at Step S11, whether the steering wheel 6 is under a turning operation (i.e., the steering angle (absolute value) is increasing). As a result, if it is under the turning operation (Step S11: YES), the controller 14 shifts to Step S12, where it calculates the steering speed based on the steering angle acquired from the steering angle sensor 8 at Step S1 in the vehicle posture control processing of FIG. 4.

Next, at Step S13, the controller 14 determines whether the steering speed is at or above a given threshold Si. As a result, if the steering speed is at or above the threshold S1 (Step S13: YES), the controller 14 shifts to Step S14, where it sets the additional deceleration based on the steering speed. This additional deceleration is a deceleration to be applied to the vehicle 1 according to the steering operation in order to control the vehicle posture as the driver intended.

In detail, the controller 14 sets the additional deceleration corresponding to the steering speed calculated at Step S12 based on the relationship between the additional deceleration and the steering speed illustrated in the map of FIG. 6. The horizontal axis in FIG. 6 indicates the steering speed, and the vertical axis indicates the additional deceleration. As illustrated in FIG. 6, if the steering speed is below the threshold $S_1$, the corresponding additional deceleration is zero. That is, if the steering speed is below the threshold $S_1$, the controller 14 will not perform the control for adding the deceleration to the vehicle 1 based on the steering operation. On the other hand, if the steering speed is at or above the threshold $S_1$, the additional deceleration corresponding to the steering speed increases gradually to a given upper limit $D_{max}$ as the steering speed increases. That is, as the steering speed increases, the additional deceleration increases and a rate of the increase is reduced. The upper limit $D_{max}$ is set as a deceleration at which the driver does not sense a control intervention even if the deceleration is added to the vehicle 1 according to the steering operation (e.g., 0.5 m/s² ≈0.05 G). Moreover, if the steering speed is above a threshold $S_2$ which is larger than the threshold $S_1$, the additional deceleration is maintained at the upper limit $D_{max}$.

Next, at Step S15, the controller 14 corrects the additional deceleration set at Step S14 based on a towing state of the vehicle 1 (it means whether the vehicle 1 is towing or not towing) according to ON/OFF of the towing mode selecting switch 32 acquired at Step S1 in the vehicle posture control processing of FIG. 4, and based on the accelerator opening acquired also at Step S1. In detail, the controller 14 corrects the additional deceleration by the gain for correcting the additional deceleration defined in the map of FIG. 7.

In FIG. 7, the horizontal axis indicates the accelerator opening, and the vertical axis indicates the gain (0≤gain≤1) for correcting the additional deceleration. Moreover, in FIG. 7, a map M1 expressed by a solid line indicates a map to be applied when the vehicle 1 is not towing (during non-towing), and a map M2 expressed by a broken line indicates a map to be applied when the vehicle 1 is towing (during towing). When the towing mode selecting switch 32 is OFF, the controller 14 determines that the vehicle 1 is not towing, and it selects the map M1. Then, the controller 14 acquires the gain according to the current accelerator opening from the map M1, and corrects the additional deceleration set at Step S14 by using the gain. On the other hand, when the towing mode selecting switch 32 is ON, the controller 14 determines that the vehicle 1 is towing, and it selects the map M2. Then, the controller 14 acquires the gain according to the current accelerator opening from the map M2, and corrects the additional deceleration set at Step S14 by using the gain. The controller 14 corrects the additional deceleration by multiplying the additional deceleration set at Step S14 by a value corresponding to the gain (0≤gain≤1). Then, the controller 14 ends the additional deceleration setting processing and returns to the main routine.

As illustrated in FIG. 7, both the maps M1 and M2 are defined so that the gain applied according to the accelerator opening becomes smaller as the accelerator opening increases. According to such a gain, the correction is performed so that the additional deceleration becomes smaller as the accelerator opening increases. Therefore, it can suppress the drag feeling of the brake resulting from generating the large deceleration by the vehicle posture control, when the driver largely stepped on the accelerator pedal 9 and is sensitive to the change in the vehicle speed.

Moreover, as illustrated in FIG. 7, the map M2 applied during towing has a larger gain according to the accelerator opening than the map M1 applied during non-towing, as a whole. That is, the maps M1 and M2 are defined so that the gain applied during towing becomes larger than the gain applied during non-towing at the same accelerator opening. In other words, the accelerator opening corresponding to the same gain is larger during towing than during non-towing. By correcting the additional deceleration with such a gain, the additional deceleration set during towing becomes larger than the additional deceleration set during non-towing at the same accelerator opening. Thus, according to the accelerator opening by the driver during towing, the additional deceleration applied to the vehicle posture control can be set appropriately, and therefore, it becomes possible to securely achieve the desired vehicle posture also during towing.

Note that although in the above example it is determined whether the vehicle 1 is towing based on ON/OFF of the towing mode selecting switch 32, the present disclosure is not limited to the determination using the towing mode selecting switch 32. In another example, the controller 14 may determine whether the vehicle 1 is towing based on the acceleration acquired from the acceleration sensor 13 at Step S1 of FIG. 4, the target acceleration determined at Step S2, and the road surface gradient. In detail, the controller 14 calculates a value (target-actual acceleration difference) obtained by subtracting an effect of the gravitational acceleration due to the road surface gradient from a difference between the target acceleration determined in the vehicle posture control processing and the actual acceleration calculated based on the temporal change in the vehicle speed. Since the relationship between the target acceleration and the basic target torque of the engine 4 is set based on the weight of the vehicle alone which is not towing, the generated torque of the engine 4 becomes insufficient for the target acceleration when the vehicle 1 is towing, and therefore, the actual acceleration may become less than the target acceleration. Then, the controller 14 determines that the vehicle 1 is towing when the target-actual acceleration difference is above a given threshold. In still another example, when the vehicle 1 is towing the trailer B (in detail, the trailer B is coupled to the vehicle 1 through the coupler H (see FIG. 1)), a switch which changes from OFF to ON may be provided to the coupler H, and the controller 14 may determine whether the vehicle 1 is towing based on an output from the switch. In still another example, the controller 14 may determine whether the vehicle 1 is towing based on whether the stroke of the rear suspension 30 detected by the stroke sensor 34 is more than a given amount.

On the other hand, if the steering wheel is not under a turning operation at Step S11 (Step S11: NO), or if the steering speed is below the threshold $S_1$ at Step S13 (Step S13: NO), the controller 14 ends the additional deceleration setting processing without setting the additional deceleration, and returns to the main routine.

Figure 8:
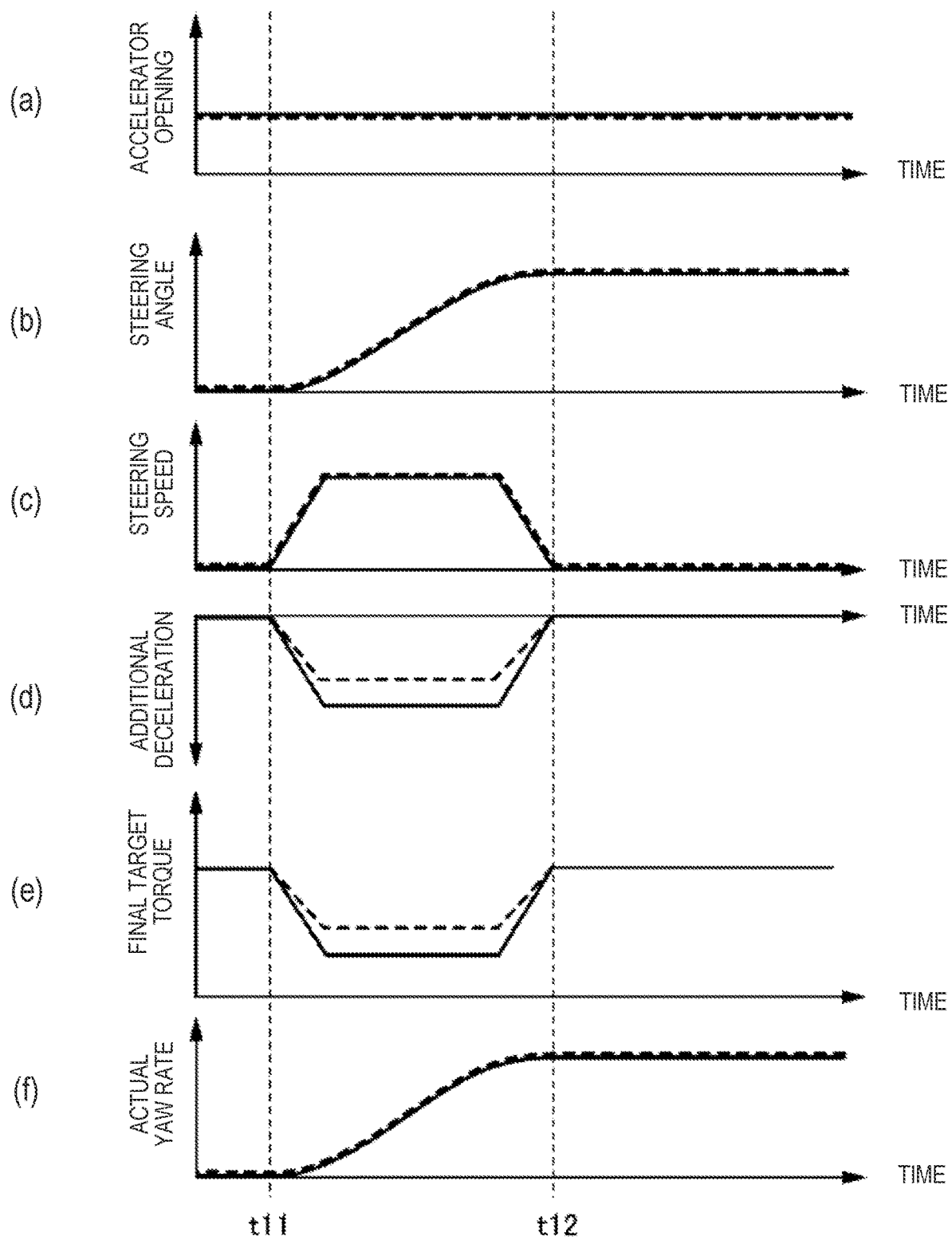
FIG. 8 is a time chart illustrating temporal changes in parameters related to the vehicle posture control according to the first embodiment of the present disclosure.

Next, operation of the control system for the vehicle according to the first embodiment of the present disclosure is described with reference to FIG. 8. FIG. 8 is a time chart illustrating temporal changes in various parameters relevant to the vehicle posture control when the vehicle 1 on which the control system for the vehicle 1 according to the first embodiment of the present disclosure is mounted is turned.

In FIG. 8, chart (a) indicates an accelerator opening, chart (b) indicates a steering angle, chart (c) indicates a steering speed, chart (d) indicates an additional deceleration, chart (e) indicates a final target torque, and chart (f) indicates an actual yaw rate. In FIG. 8, a solid line indicates a change in the parameter when the vehicle 1 is towing the trailer B (when the vehicle body rear part sinks more than a given amount relative to the front part), and a broken line indicates a change in the parameter when the vehicle 1 is not towing the trailer B (when the vehicle body rear part does not sink more than the given amount relative to the front part). Here, both when the vehicle 1 is towing the trailer B (during towing) and when the vehicle 1 is not towing the trailer B (during non-towing), similar turning operations of the steering wheel 6 are performed (charts (b) and (c)) at the same accelerator opening (chart (a)).

As illustrated in chart (b), a turning operation of the steering wheel 6 is performed from Time t11. In this case, from Time t11 to Time t12, as illustrated in chart (c), the steering speed becomes above the threshold $S_1$, and the additional deceleration is set as illustrated in chart (d) based on the steering speed. In detail, although the steering speed is the same during towing and during non-towing, the additional deceleration (absolute value) is larger during towing than during non-towing. This is because the accelerator opening is the same during towing and during non-towing (chart (a)), and the gain applied for correcting the additional deceleration became larger during towing than during non-towing (see the maps M1 and M2 of FIG. 7). That is, it is because the correction is performed by using the gain so that the additional deceleration (absolute value) becomes larger during towing than during non-towing. As illustrated in chart (e), the final target torque is set according to such an additional deceleration. In detail, the final target torque is smaller during towing (i.e., the reduced amount of the generated torque of the engine 4 is larger) than during non-towing. Then, the actual yaw rate as illustrated in chart (f) is exhibited by the vehicle 1 by controlling the engine 4 to generate such a final target torque. In detail, almost the same actual yaw rate is exhibited by the vehicle 1 during towing and during non-towing.

Thus, when the vehicle 1 is towing the trailer B, the controller 14 uses the map M2 defined according to the accelerator opening to correct the additional deceleration so that the additional deceleration (absolute value) becomes larger in the additional deceleration setting processing, and controls the engine 4 so that the reduced amount of the generated torque becomes larger than when the vehicle 1 is not towing the trailer B. Thus, the pitching moment for sinking the vehicle body front part when the deceleration is applied to the vehicle 1 can be strengthened more than during non-towing. Therefore, also in the situation where the pitching of the vehicle body is suppressed by the vertical load applied from the trailer B to the vehicle body rear part of the vehicle 1 through the coupler H, the insufficient sinking of the vehicle body front part when giving the deceleration by the vehicle posture control can be compensated, thereby appropriately securing the vehicle turning performance by the vehicle posture control. That is, as illustrated in chart (f), without depending on whether the vehicle 1 is during towing the trailer B, the suitable actual yaw rate can be generated on the vehicle 1 by the vehicle posture control, and the desired vehicle turning performance can be obtained.

(Operation and Effects)

Next, operation and effects of the control system for the vehicle according to the first embodiment of the present disclosure is described.

According to this embodiment, the controller 14 sets the additional deceleration in consideration of the accelerator opening, and when setting the additional deceleration according to the accelerator opening, the additional deceleration set at the same accelerator opening is made larger during towing than during non-towing. Thus, according to the accelerator opening by the driver during towing, the additional deceleration applied to the vehicle posture control can be set appropriately, and therefore, it becomes possible to securely achieve the desired vehicle posture also during towing. In detail, in the situation where the accelerator opening is large during towing (when the accelerator openings during towing and during non-towing at similar speeds and accelerations are compared), by applying the additional deceleration which is set larger according to the accelerator opening, the insufficient sinking of the vehicle body front part by the vehicle posture control can be compensated appropriately, and it becomes possible to securely achieve the desired vehicle turning performance.

Moreover, according to this embodiment, when the towing mode is selected by the driver operating the towing mode selecting switch 32, the controller 14 determines that the vehicle is towing and increases the additional deceleration which is set according to the accelerator opening. Thus, since the mode of the additional deceleration set in the vehicle posture control is changed when the driver positively operates the switch 32 to select the towing mode as the traveling mode, the uncomfortable feeling given to the driver can be suppressed appropriately by this change.

Moreover, according to this embodiment, since the controller 14 decreases the additional deceleration as the accelerator opening increases, it can suppress the drag feeling of the brake resulting from generating the large deceleration by the vehicle posture control, when the driver largely stepped on the accelerator pedal 9 and is sensitive to the change in the vehicle speed.

Second Embodiment

Next, a second embodiment of the present disclosure is described. In the first embodiment, the posture control of the vehicle 1 is performed by reducing the generated torque of the engine 4 when a turning operation of the steering wheel 6 is carried out. However, in the second embodiment, when the turning operation of the steering wheel 6 is carried out, the set additional deceleration is added to the vehicle 1 by generating the braking force by the brake device 16. Note that in the following, as for the same configuration and processing as the first embodiment, description thereof is suitably omitted. That is, the configuration and processing which are not particularly described here are similar to the first embodiment.

Figure 9:
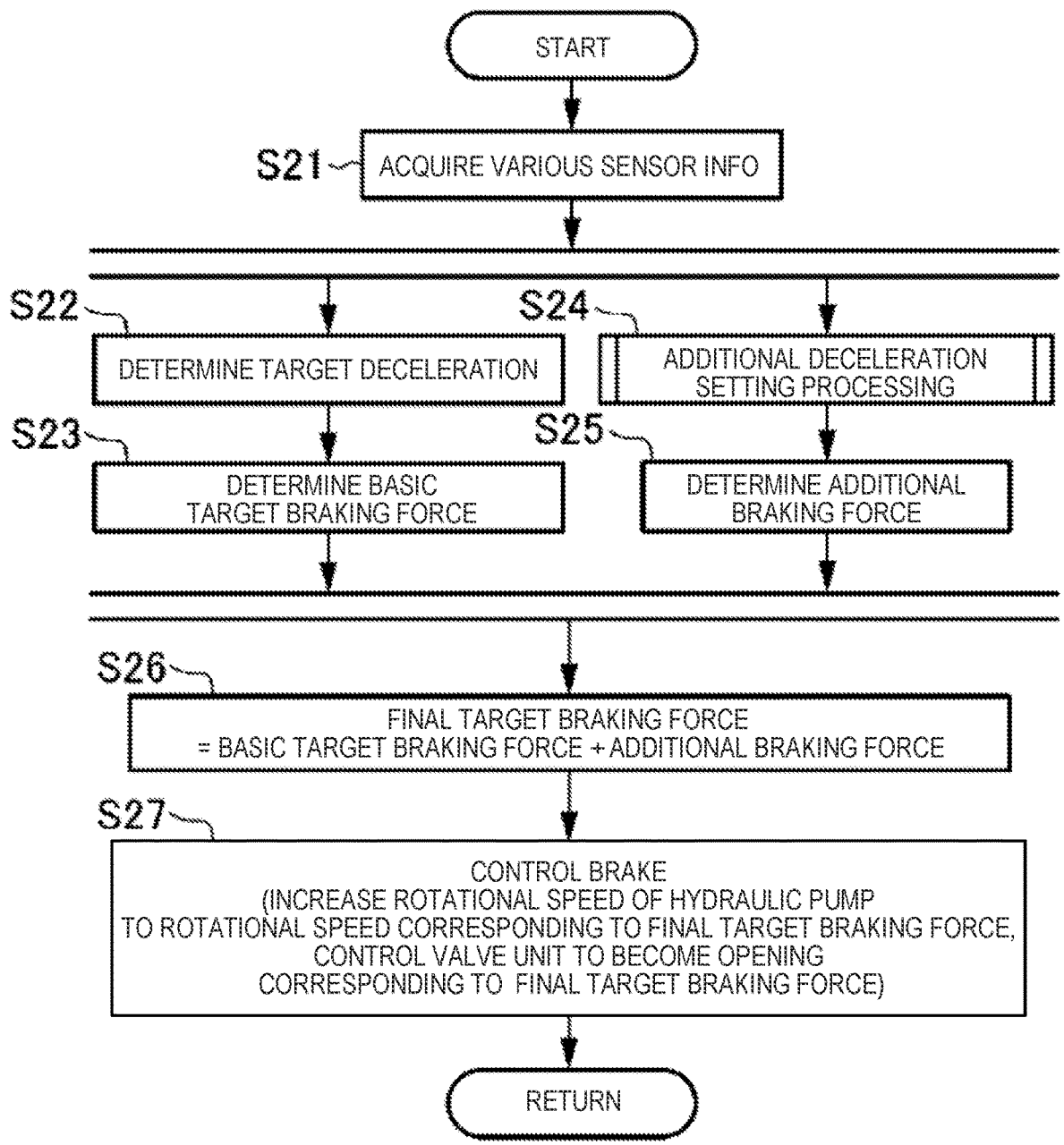
FIG. 9 is a flowchart of a vehicle posture control processing according to a second embodiment of the present disclosure.

First, a vehicle posture control processing according to the second embodiment of the present disclosure is described with reference to FIG. 9. FIG. 9 is a flowchart of the vehicle posture control processing according to the second embodiment of the present disclosure.

First, at Step S21, the controller 14 acquires the detection signals outputted from the various sensors, as information on the operating state. Next, at Step S22, the controller 14 sets a target deceleration to be applied to the vehicle 1 based on the operating state of the vehicle 1 acquired at Step S21. In detail, a deceleration map (not illustrated) which defines a deceleration corresponding to a brake-pedal stepping amount, a brake-pedal stepping speed, and a vehicle speed is stored in advance in the memory. The controller 14 refers to the deceleration map and determines the deceleration corresponding to the brake-pedal stepping amount, the brake-pedal stepping speed, and the vehicle speed, which are acquired at Step S21, as a target deceleration.

Next, at Step S23, the controller 14 sets a basic target braking force by the brake device 16 for achieving the target deceleration set at Step S22.

In parallel to the processing at Steps S22 and S23, the controller 14 performs, at Step S24, the additional deceleration setting processing described above (see FIGS. 5 to 7), and based on the steering speed of the steering wheel 6, it sets the deceleration to be applied to the vehicle 1 in order to control the vehicle posture.

Next, at Step S25, the controller 14 determines an additional braking force based on the additional deceleration set by the additional deceleration setting processing at Step S24. In detail, the controller 14 determines the additional braking force required for achieving the additional deceleration by adding the braking force, based on the current vehicle speed, the current road surface gradient, etc. which are acquired at Step S21.

After the processing at Steps S23 and S25, the controller 14 determines, at Step S26, a final target braking force based on the basic target braking force determined at Step S23 and the additional braking force determined at Step S25. For example, the controller 14 sets a value obtained by adding the additional braking force to the basic target braking force as the final target braking force.

Next, at Step S27, the controller 14 controls the brake device 16 to generate the final target braking force determined at Step S26. In detail, the controller 14 outputs a braking-force command value to the brake control system 18 based on the final target braking force determined at Step S26. For example, the brake control system 18 stores in advance a map which defines a relationship between the braking-force command value and the rotational speed of the hydraulic pump 20, and refers to this map and actuates the hydraulic pump 20 at a rotational speed corresponding to the braking-force command value (in one example, the power supplied to the hydraulic pump 20 is increased to increase the rotational speed of the hydraulic pump 20 to the rotational speed corresponding to the braking-force command value). Moreover, for example, the brake control system 18 stores in advance a map which defines a relationship between the braking-force command value and the opening of the valve unit 22, and refers to this map and controls the valve units 22 individually so that the opening becomes the opening corresponding to the braking-force command value (in one example, the power supplied to the solenoid valve is increased to increase the opening of the solenoid valve to the opening corresponding to the braking-force command value) to adjust the braking force of each wheel. After Step S27, the controller 14 ends the vehicle posture control processing.

Figure 10:
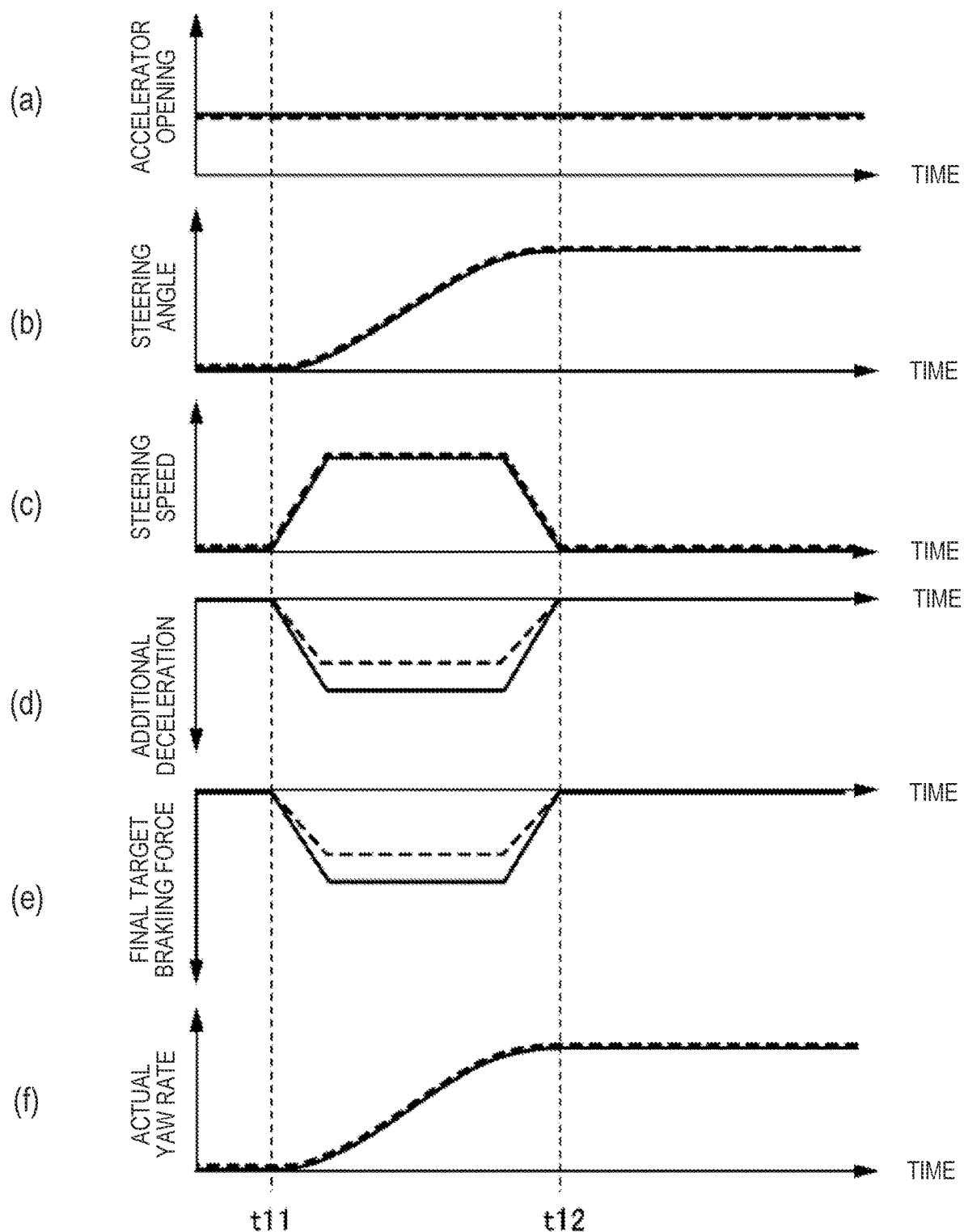
FIG. 10 is a time chart illustrating temporal changes in the parameters related to the vehicle posture control according to the second embodiment of the present disclosure.

Next, operation of the control system for the vehicle according to the second embodiment of the present disclosure is described with reference to FIG. 10. FIG. 10 is a time chart illustrating temporal changes in the various parameters relevant to the vehicle posture control when the vehicle 1 on which the control system for the vehicle according to the second embodiment of the present disclosure is mounted is turned.

In FIG. 10, chart (a) indicates the accelerator opening, chart (b) indicates the steering angle, chart (c) indicates the steering speed, chart (d) indicates the additional deceleration, chart (e) indicates the final target braking force, and chart (f) indicates the actual yaw rate. In FIG. 10, the solid line indicates the change in the parameter during towing, and the broken line indicates the change in the parameter during non-towing. Here, both during towing and during non-towing, similar turning operations of the steering wheel 6 are performed (charts (b) and (c)) at the same accelerator opening (chart (a)). Note that, in FIG. 10, charts (a) to (d) and (f) are same as those of FIG. 8, and only chart (e) differs from FIG. 8.

In detail, in the second embodiment, the final target braking force is set as illustrated in chart (e), according to the additional deceleration illustrated in chart (d) which is set based on the accelerator opening and the steering speed (see charts (a) and (c)). That is, since the accelerator opening is the same during towing and during non-towing, the additional deceleration becomes larger and the final target braking force (absolute value) becomes larger during towing than during non-towing. Then, by controlling the brake device 16 to generate such a final target braking force, the actual yaw rate as illustrated in chart (f) is exhibited by the vehicle 1. In detail, the almost same actual yaw rate is exhibited by the vehicle 1 both when the vehicle 1 is towing the trailer B and not towing the trailer B.

Also according to the second embodiment described above, by appropriately setting the additional deceleration to be applied to the vehicle posture control according to the accelerator opening by the driver during towing, the desired vehicle posture can securely be realized also during towing. In detail, even when the accelerator opening is larger during towing than during non-towing, by applying the additional deceleration set larger according to the accelerator opening, the insufficient sinking of the vehicle body front part by the vehicle posture control can be compensated appropriately, and it becomes possible to securely achieve the desired vehicle turning performance.

Third Embodiment

Next, a third embodiment of the present disclosure is described. In the first embodiment, when a turning operation of the steering wheel 6 is carried out, the posture control of the vehicle 1 is performed by reducing the generated torque of the engine 4. However, in the third embodiment, when a turning operation of the steering wheel 6 is carried out, the set additional deceleration is added to the vehicle 1 by causing a generator which is driven by the wheels to perform regeneration. Note that in the following, as for the same configuration and processing as the first embodiment described above, description thereof is suitably omitted. That is, the configuration and processing which are not particularly described here are similar to the first embodiment.

Figure 11:
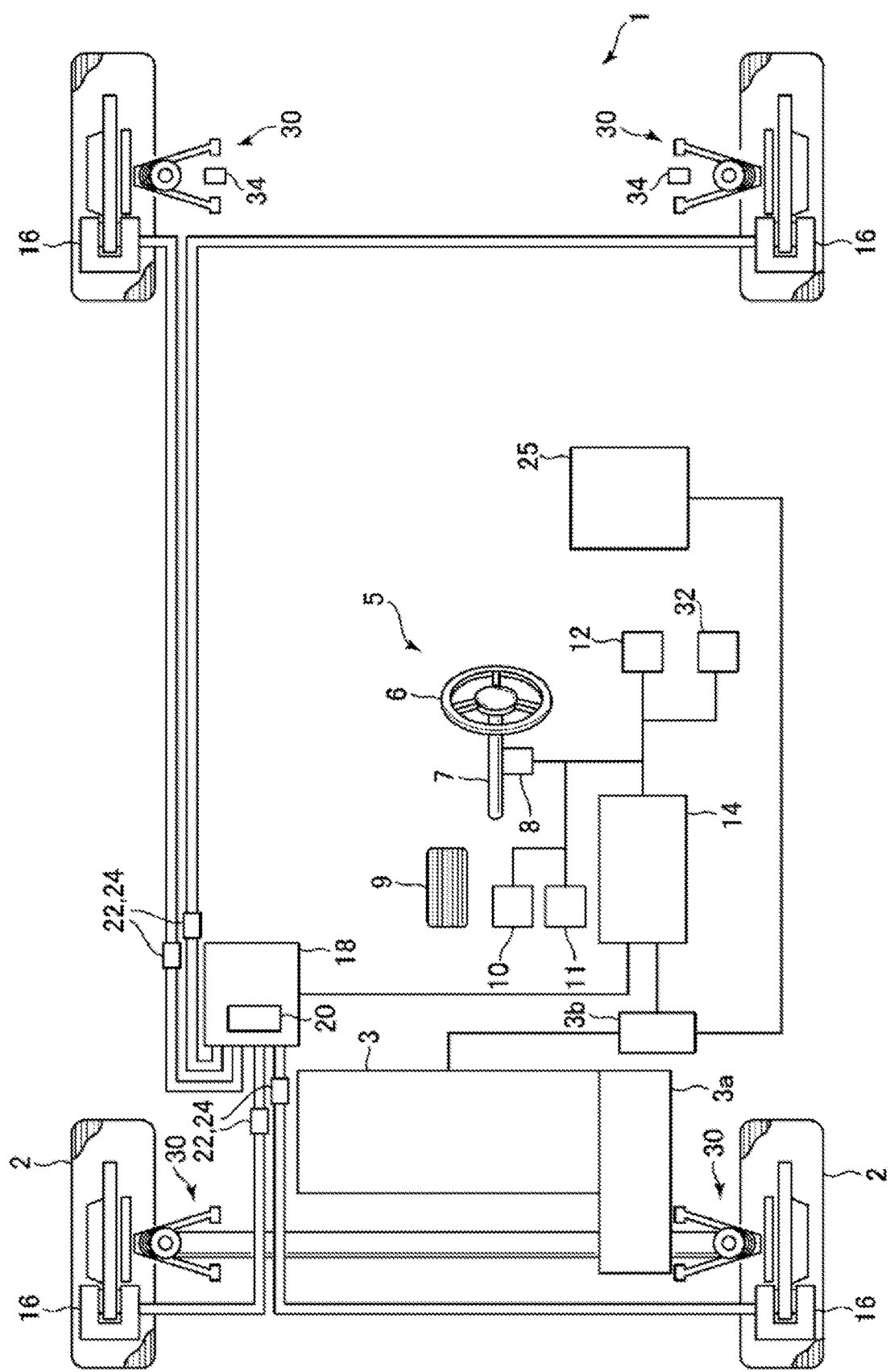
FIG. 11 is a block diagram illustrating the overall configuration of the vehicle on which a control system for the vehicle according to a third embodiment of the present disclosure is mounted.

First, a configuration of the vehicle on which a control system for the vehicle according to the third embodiment of the present disclosure is mounted is described with reference to FIGS. 11 and 12. FIG. 11 is a block diagram illustrating the overall configuration of the vehicle on which the control system for the vehicle according to the third embodiment of the present disclosure is mounted, and FIG. 12 is a block diagram illustrating an electrical configuration of the control system for the vehicle according to the third embodiment of the present disclosure.

Figure 12:
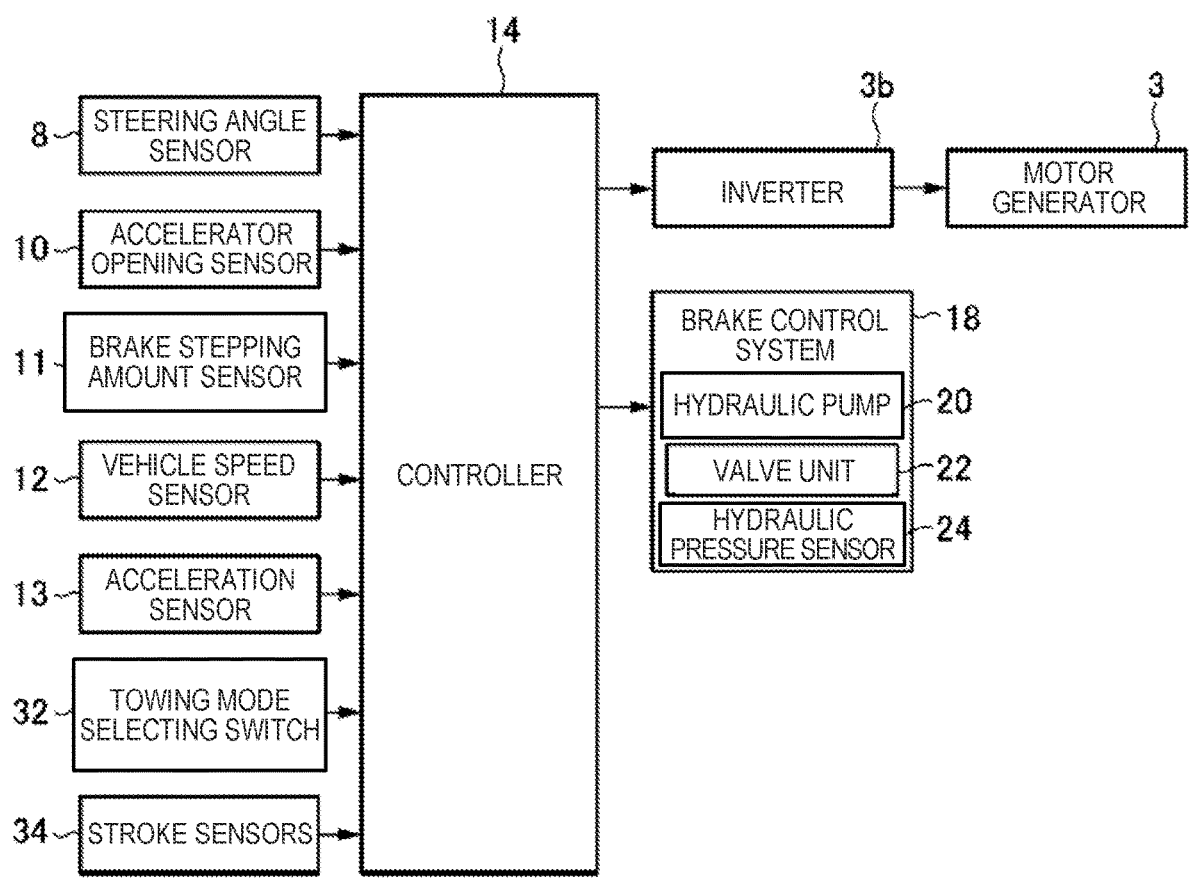
FIG. 12 is a block diagram illustrating an electrical configuration of the control system for the vehicle according to the third embodiment of the present disclosure.

In the third embodiment, as illustrated in FIGS. 11 and 12, a motor generator 3 having a function to drive the front wheels 2 (i.e., a function as an electric motor), and a function to regenerate power by being driven by the front wheels 2 (i.e., a function as a generator) is mounted on the vehicle 1. A force is transmitted to the motor generator 3 from the front wheels 2 through a transmission 3a, and the motor generator 3 is controlled by the controller 14 through an inverter 3b. Further, the motor generator 3 is connected with a battery 25 through the inverter 3b, and when generating a driving force, the power is supplied from the battery 25, and when regenerating the power, the power is supplied to the battery 25 to charge the battery 25.

The controller 14 performs a control for the motor generator 3 and the brake control system 18 based on the detection signals outputted from the various sensors which detect the operating state of the vehicle 1. In detail, when driving the vehicle 1, the controller 14 calculates for the target torque (driving torque) to be given to the vehicle 1, and it outputs the control signal to the inverter 3b so that the motor generator 3 generates the target torque. On the other hand, when braking the vehicle 1, the controller 14 calculates a target regeneration torque to be given to the vehicle 1, and it outputs the control signal to the inverter 3b so that the motor generator 3 generates the target regeneration torque. Moreover, when braking the vehicle 1, the controller 14 may calculate a target braking force to be given to the vehicle 1 alternatively or additionally to using such a regeneration torque, and may output the control signal to the brake control system 18 so that the target braking force is achieved. In this case, by controlling the hydraulic pump 20 and the valve unit 22 of the brake control system 18, the controller 14 generates the desired braking force by the brake device 16.

Figure 13:
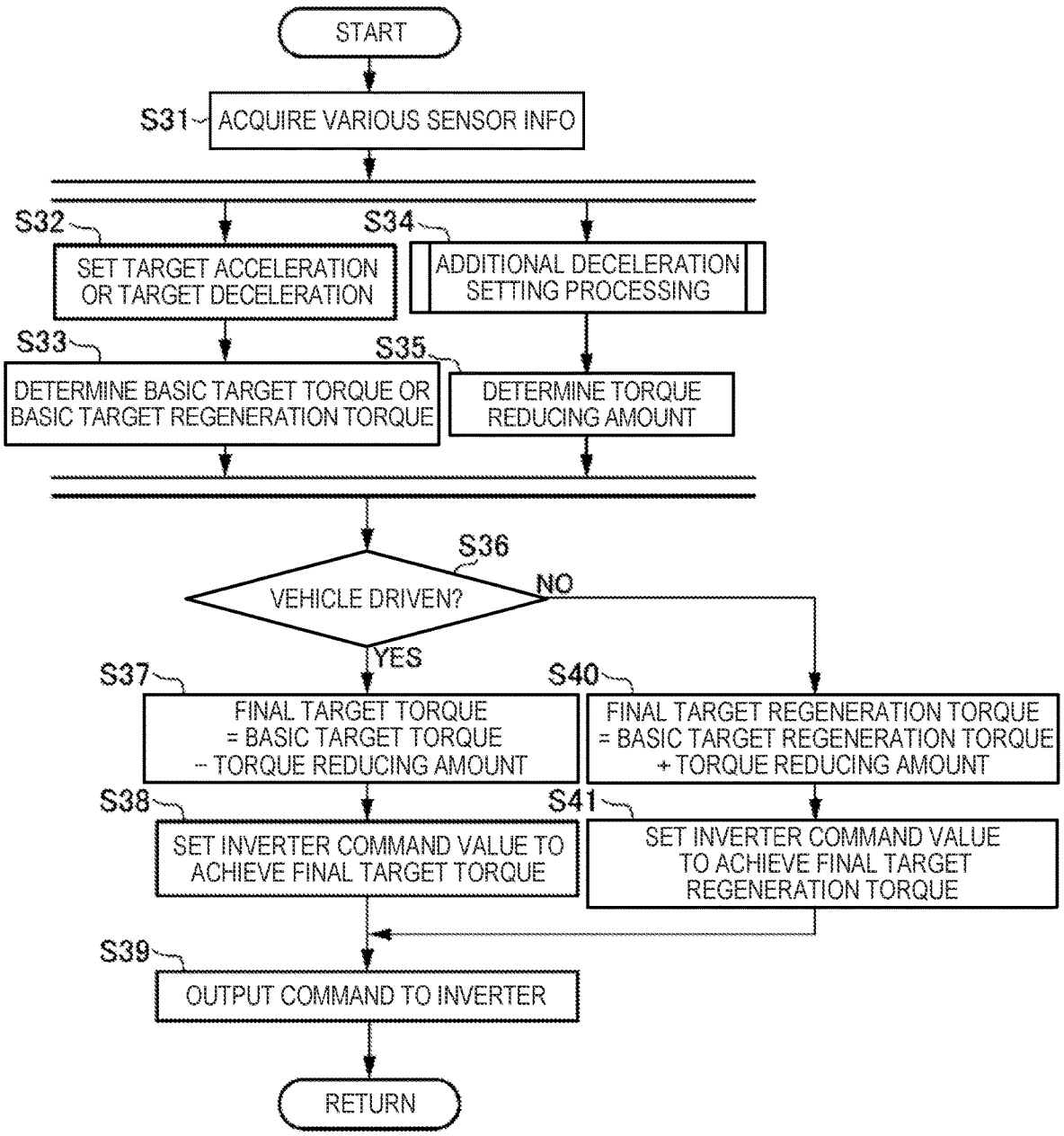
FIG. 13 is a flowchart of a vehicle posture control processing according to the third embodiment of the present disclosure.

Next, a vehicle posture control processing executed by the control system for the vehicle in the third embodiment of the present disclosure is described with reference to FIG. 13. FIG. 13 is a flowchart of the vehicle posture control processing according to the third embodiment of the present disclosure.

As illustrated in FIG. 13, at Step S31, the controller 14 acquires the detection signals outputted from the various sensors, as the information on the operating state. Next, at Step S32, the controller 14 sets the target acceleration or the target deceleration to be applied to the vehicle 1 based on the operating state of the vehicle 1 acquired at Step S31. In detail, the controller 14 sets the target acceleration or the target deceleration based on the accelerator stepping amount, the brake-pedal stepping amount, the vehicle speed, etc.

Next, at Step S33, if the target acceleration is set at Step S32, the controller 14 sets a basic target torque of the motor generator 3 for achieving the target acceleration, and on the other hand, if the target deceleration is set at Step S32, it sets a basic target regeneration torque of the motor generator 3 for achieving the target deceleration.

Moreover, in parallel to the processing at Steps S32 and S33, the controller 14 performs, at Step S34, the additional deceleration setting processing described above (see FIGS. 5 to 7), and based on the steering speed of the steering wheel 6, it sets the deceleration to be applied to the vehicle 1 in order to control the vehicle posture.

Next, at Step S35, the controller 14 determines the torque reducing amount based on the additional deceleration set by the additional deceleration setting processing at Step S34. In detail, the controller 14 determines an amount of torque required for achieving the additional deceleration by lowering the generated torque of the motor generator 3 or increasing the regeneration torque, based on the current vehicle speed, gear stage, road surface gradient, etc. which are acquired at Step S31.

Next, at Step S36, the controller 14 determines whether the vehicle 1 is driven (i.e., whether the vehicle 1 is braked). In one example, if the basic target torque is set at Step S33 (i.e., if the target acceleration is set at Step S32), the controller 14 determines that the vehicle 1 is driven, and on the other hand, if the basic target regeneration torque is set at Step S33 (i.e., if the target deceleration is set at Step S32), the controller 14 determines that the vehicle 1 not driven. In another example, the controller 14 may perform this determination based on the detection signals from the accelerator opening sensor 10 and the brake stepping amount sensor 11.

If the controller 14 determines at Step S36 that the vehicle 1 is driven (Step S36: YES), it determines, at Step S37, a final target torque based on the basic target torque set at Step S33 and the torque reducing amount set at Step S35. In detail, the controller 14 sets a value obtained by subtracting the torque reducing amount from the basic target torque as the final target torque. That is, the controller 14 reduces the driving torque given to the vehicle 1. Note that if the additional deceleration is not set at Step S34 (i.e., if the torque reducing amount is zero), the controller 14 applies the basic target torque as the final target torque as it is.

Next, at Step S38, the controller 14 sets a command value for the inverter 3b (inverter command value) for achieving the final target torque determined at Step S37. That is, the controller 14 sets the inverter command value (control signal) for causing the motor generator 3 to generate the final target torque. Then, at Step S39, the controller 14 outputs the inverter command value set at Step S38 to the inverter 3b. After Step S39, the controller 14 ends the vehicle posture control processing.

On the other hand, if the controller 14 determines that the vehicle 1 is not driven at Step S36, i.e., if the vehicle 1 is braked (Step S36: NO), it determines, at Step S40, a final target regeneration torque based on the basic target regeneration torque determined at Step S33 and the torque reducing amount determined at Step S35. In detail, the controller 14 sets a value obtained by adding the torque reducing amount to the basic target regeneration torque as the final target regeneration torque (in principle, the basic target regeneration torque and the torque reducing amount are expressed by positive values). That is, the controller 14 increases the regeneration torque (braking torque) given to the vehicle 1. Note that if the additional deceleration is not determined at Step S34 (i.e., if the torque reducing amount is zero), the controller 14 applies the basic target regeneration torque as the final target regeneration torque as it is.

Next, at Step S41, the controller 14 sets a command value for the inverter 3b (inverter command value) for achieving the final target regeneration torque determined at Step S40. That is, the controller 14 sets the inverter command value (control signal) for causing the motor generator 3 to generate the final target regeneration torque. Then, at Step S39, the controller 14 outputs the inverter command value set at Step S41 to the inverter 3b. After Step S39, the controller 14 ends the vehicle posture control processing.

Figure 14:
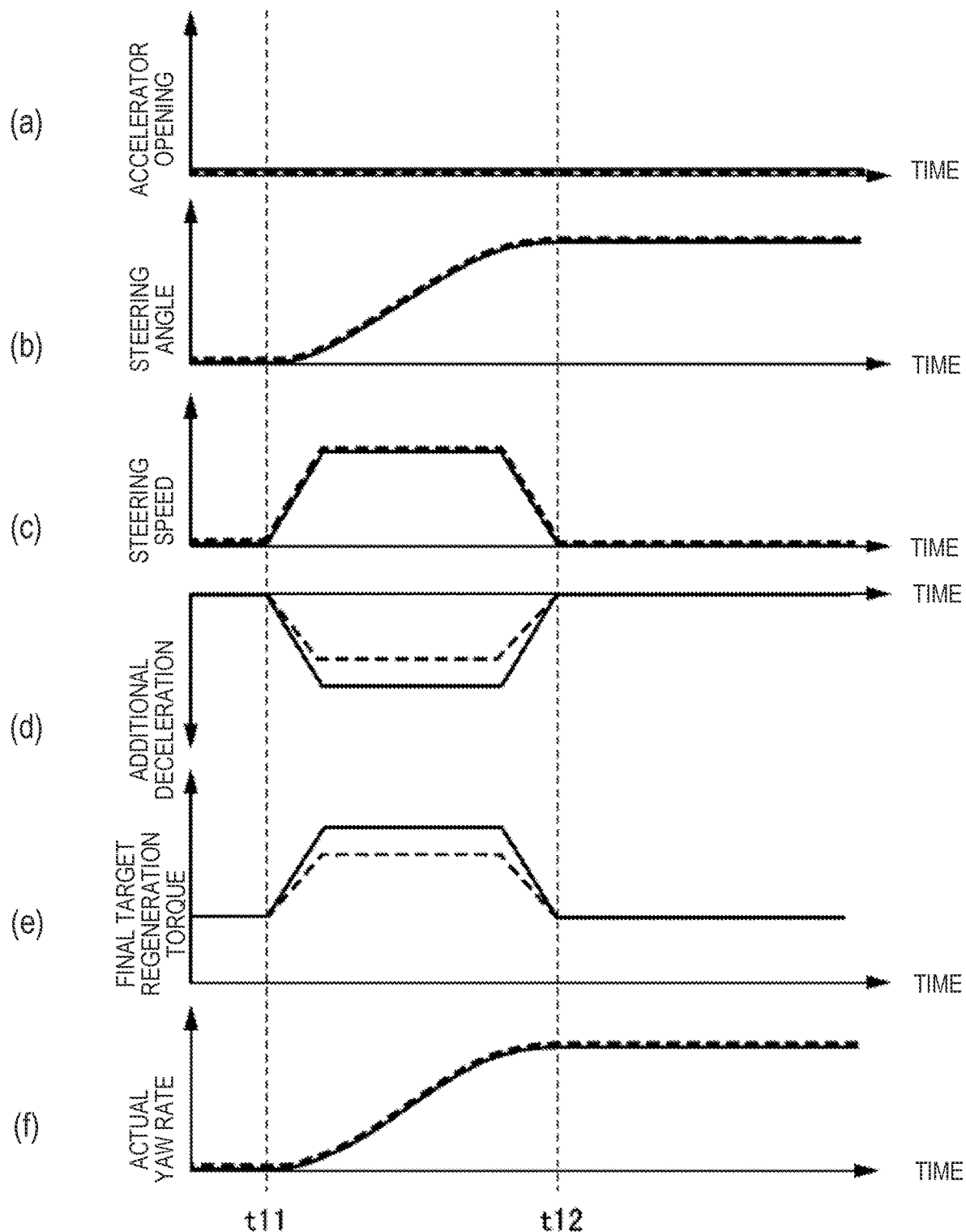
FIG. 14 is a time chart illustrating temporal changes in the parameters related to the vehicle posture control according to the third embodiment of the present disclosure.

Next, operation of the control system for the vehicle according to the third embodiment of the present disclosure is described with reference to FIG. 14. FIG. 14 is a time chart illustrating temporal changes in the various parameters relevant to the vehicle posture control, when the vehicle 1 on which the control system for the vehicle according to the third embodiment of the present disclosure is mounted is turned, and illustrating a case where the vehicle 1 is not driven (i.e., when the accelerator opening is zero and "Step S36: NO" in the flowchart of FIG. 13).

In FIG. 14, chart (a) indicates the accelerator opening, chart (b) indicates the steering angle, chart (c) indicates the steering speed, chart (d) indicates the additional deceleration, chart (e) indicates the final target regeneration torque, and chart (f) indicates the actual yaw rate. In FIG. 14, a solid line indicates a change in the parameter during towing, and a broken line indicates a change in the parameter during non-towing. Here, both during towing and during non-towing, similar turning operations of the steering wheel 6 are performed (charts (b) and (c)) at the same accelerator opening (in detail, zero) (chart (a)). Note that in FIG. 14, chart (b) to (d) and (f) are the same as those of FIG. 8, and charts (a) and (e) differ from FIG. 8.

In detail, in the third embodiment, the final target regeneration torque is set as illustrated in chart (e) according to the additional deceleration illustrated in chart (d) which is set based on the accelerator opening (in this case, the accelerator opening is zero and a comparatively large gain is set based on the map of FIG. 7) and the steering speed (see charts (a) and (c)). That is, since the accelerator opening is the same during towing and during non-towing, the additional deceleration becomes larger and the final target regeneration torque becomes larger during towing than during non-towing. Then, by controlling the motor generator 3 to generate such a final target regeneration torque, the actual yaw rate as illustrated in chart (f) is exhibited by the vehicle 1. In detail, the almost same actual yaw rate is exhibited by the vehicle 1 both when the vehicle 1 is towing the trailer B and not towing the trailer B.

Also according to the third embodiment described above, the desired vehicle posture pcan securely be realized also during towing by appropriately setting the additional deceleration applied to the vehicle posture control according to the accelerator opening by the driver during towing. In detail, by applying the additional deceleration set larger according to the accelerator opening even when the accelerator opening is larger during towing than during non-towing, the insufficient sinking of the vehicle body front part by the vehicle posture control can be compensated appropriately, and it becomes possible to securely achieve the desired vehicle turning performance.

Note that FIG. 14 illustrates the time chart when the vehicle 1 is not driven, i.e., the time chart for the vehicle posture control executed when the motor generator 3 regenerates (the control at Steps S40 and S41 is performed after "Step S36: NO" in FIG. 13). On the other hand, if the vehicle 1 is driven i.e., in the vehicle posture control executed when the motor generator 3 generates the driving force (the control at Steps S37 and S38 is performed after "Step S36: YES" in FIG. 13), it becomes the same time chart as FIG. 8. That is, in the third embodiment, not the engine 4 but the motor generator 3 functions as the drive source, and the final target torque illustrated in chart (e) of FIG. 8 is achieved by the driving force of the motor generator 3.

<Modifications>

Although in the above embodiments the additional deceleration which is set based on whether or not the vehicle is towing is changed, in another example, the additional deceleration which is set based on whether the sinking of the vehicle body rear part is more than a given amount may be changed. For example, the controller 14 may acquire a pay load of the vehicle body rear part, and may determine that the sinking of the vehicle body rear part is more than the given amount when the pay load is more than a given weight. The pay load of the vehicle body rear part may be detected, for example, based on the acceleration acquired from the acceleration sensor 13, the target acceleration determined in the vehicle posture control processing, and the road surface gradient. In detail, a value obtained by subtracting the effect of the gravitational acceleration due to the road surface gradient from the difference between the target acceleration and the actual acceleration calculated based on the temporal change in the vehicle speed (target-actual acceleration difference) may be calculated. Since a relationship between the target acceleration and the basic target torque of the engine 4 is set based on the weight of the vehicle when a heavy load is not loaded on the vehicle body rear part, the generated torque of the engine 4 or the motor generator 3 becomes insufficient relative to the target acceleration when the heavy load is loaded on the vehicle body rear part, and therefore, the actual acceleration may become smaller than the target acceleration. Thus, if the target-actual acceleration difference is above a given threshold, the controller 14 determines that the pay load of the vehicle body rear part is more than the given weight (i.e., the sinking of the vehicle body rear part is more than the given amount). In still another example, the controller 14 may determine whether the sinking of the vehicle body rear part is more than the given amount based on the detected value of the stroke sensor 34 which detects the stroke of the rear suspension 30.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Front Wheel
3 Motor Generator
4 Engine
6 Steering Wheel
8 Steering Angle Sensor
9 Accelerator Pedal
10 Accelerator Opening Sensor
12 Vehicle Speed Sensor
14 Controller
16 Brake Device
18 Brake Control System
32 Towing Mode Selecting Switch
A Tractor
B Trailer

What is claimed is:

1. A control system for a vehicle, comprising:
an accelerator pedal and a steering wheel configured to be operated by a driver;
an accelerator opening sensor configured to detect an accelerator opening corresponding to operation of the accelerator pedal;
a steering angle sensor configured to detect a steering angle corresponding to operation of the steering wheel; and
a controller configured to set an additional deceleration to be applied to the vehicle in order to control a posture of the vehicle based on the steering angle detected by the steering angle sensor, when the steering wheel is turned, and apply the additional deceleration to the vehicle,
wherein the controller sets the additional deceleration based also on the accelerator opening detected by the accelerator opening sensor, in addition to the steering angle, and sets the additional deceleration larger while the vehicle is towing than while the vehicle is not towing, when compared at the same accelerator opening,
wherein the controller includes a first map and a second map defining gains to be used for correcting the additional deceleration calculated according to a steering speed,
wherein both the first and second maps define the gains so that the gain becomes smaller as the accelerator opening increases, the gain of the second map being larger than the gain of the first map, and
wherein, when the vehicle is not towing, the controller controls the vehicle so that the additional deceleration is corrected based on the gain calculated based on the first map, and when the vehicle is towing, the controller controls the vehicle so that the additional deceleration is corrected based on the gain calculated based on the second map.

2. The control system of claim 1, further comprising a switch for selecting a traveling mode set to the vehicle, the traveling mode at least including a towing mode,
wherein the controller sets the additional deceleration larger while the towing mode is selected by the switch than while the towing mode is not selected, when compared at the same accelerator opening.

3. The control system of claim 2, further comprising a drive source configured to generate torque for driving the vehicle,
wherein the controller controls the drive source to reduce the torque generated by the drive source so that the additional deceleration is applied to the vehicle.

4. The control system of claim 2, further comprising a braking system configured to give a braking force to the vehicle,
wherein the controller controls the braking system to give the braking force to the vehicle so that the additional deceleration is applied to the vehicle.

5. The control system of claim 2, further comprising a generator configured to be driven by wheels of the vehicle and regenerate power,
wherein the controller controls the generator so that the generator regenerates the power to apply the additional deceleration to the vehicle.

6. The control system of claim 3, wherein the controller reduces the additional deceleration as the accelerator opening detected by the accelerator opening sensor increases.

7. The control system of claim 6, wherein the controller calculates the steering speed based on the steering angle detected by the steering angle sensor, and sets the additional deceleration larger as the steering speed increases.

8. The control system of claim 1, further comprising a drive source configured to generate torque for driving the vehicle,
wherein the controller controls the drive source to reduce the torque generated by the drive source so that the additional deceleration is applied to the vehicle.

9. The control system of claim 1, further comprising a braking system configured to give a braking force to the vehicle,
wherein the controller controls the braking system to give the braking force to the vehicle so that the additional deceleration is applied to the vehicle.

10. The control system of claim 1, further comprising a generator configured to be driven by wheels of the vehicle and regenerate power,
wherein the controller controls the generator so that the generator regenerates the power to apply the additional deceleration to the vehicle.

11. The control system of claim 1, wherein the controller reduces the additional deceleration as the accelerator opening detected by the accelerator opening sensor increases.

12. The control system of claim 1, wherein the controller calculates the steering speed based on the steering angle detected by the steering angle sensor, and sets the additional deceleration larger as the steering speed increases.

13. The control system of claim 2, wherein the controller reduces the additional deceleration as the accelerator opening detected by the accelerator opening sensor increases.

14. The control system of claim 2, wherein the controller calculates the steering speed based on the steering angle detected by the steering angle sensor, and sets the additional deceleration larger as the steering speed increases.

15. The control system of claim 8, wherein the controller reduces the additional deceleration as the accelerator opening detected by the accelerator opening sensor increases.

16. The control system of claim 8, wherein the controller calculates the steering speed based on the steering angle detected by the steering angle sensor, and sets the additional deceleration larger as the steering speed increases.

17. The control system of claim 9, wherein the controller reduces the additional deceleration as the accelerator opening detected by the accelerator opening sensor increases.

18. A control system for a vehicle, comprising:
an accelerator pedal and a steering wheel configured to be operated by a driver;
an accelerator opening sensor configured to detect an accelerator opening corresponding to operation of the accelerator pedal;
a steering angle sensor configured to detect a steering angle corresponding to operation of the steering wheel; and
a controller configured to set an additional deceleration to be applied to the vehicle in order to control a posture of the vehicle based on the steering angle detected by the steering angle sensor, when the steering wheel is turned, and apply the additional deceleration to the vehicle,
wherein the controller sets the additional deceleration based also on the accelerator opening detected by the accelerator opening sensor, in addition to the steering angle, and sets the additional deceleration larger while the vehicle is towing than while the vehicle is not towing, when compared at the same accelerator opening,
wherein the vehicle is comprised of a trailer, a coupler, and a tractor,
wherein the center of gravity position of the trailer is located forward of an axle thereof so that a given vertical load is applied to the coupler,
wherein the vehicle is provided with a towing mode selecting switch configured to be turned on by the driver when the trailer is coupled to a rear part of the tractor through the coupler,
wherein, when the steering wheel is turned, the controller sets the additional deceleration applied to the vehicle larger while the towing mode selecting switch is turned on than while the towing mode selecting switch is turned off, wherein the controller includes a first map and a second map defining gains to be used for correcting the additional deceleration calculated according to a steering speed, wherein both the first and second maps define the gains so that the gain becomes smaller as the accelerator opening increases, the gain of the second map being larger than the gain of the first map, and wherein, when the vehicle is not towing, the controller controls the vehicle so that the additional deceleration is corrected based on the gain calculated based on the first map, and when the vehicle is towing, the controller controls the vehicle so that the additional deceleration is corrected based on the gain calculated based on the second map.

\* \* \* \* \*